INVENTORS:
ARTHUR L. BARRETT
JAY H. KELLEY
RAYMOND J. WACHT
DONALD WIEBE
BY
ATTORNEY

March 16, 1965  A. L. BARRETT ETAL  3,173,771
GAS AND LIQUID CONTACT METHOD AND APPARATUS
Original Filed March 15, 1956  5 Sheets-Sheet 4

INVENTORS:
ARTHUR L. BARRETT
JAY H. KELLEY
RAYMOND J. WACHT
DONALD WIEBE
BY
*Terrell L. Ruhlman*
ATTORNEY

INVENTORS:
ARTHUR L. BARRETT
JAY H. KELLEY
RAYMOND J. WACHT
DONALD WIEBE

ATTORNEY 3,173,771
GAS AND LIQUID CONTACT METHOD
AND APPARATUS
Arthur L. Barrett, Franklin, and Jay H. Kelley, Greensburg, Pa., Raymond J. Wacht, Overland Park, Kans., and Donald Wiebe, Greensburg, Pa., assignors to Joy Manufacturing Company, Pittsburgh, Pa., a corporation of Pennsylvania
Continuation of application Ser. No. 571,795, Mar. 15, 1956. This application Apr. 16, 1962, Ser. No. 190,846
27 Claims. (Cl. 55—92)

Our invention relates to devices of the reactor, scrubber, and/or separator family, and especially to those of the so-called "wet-type." More particularly, our invention relates to an improved device of the reactor type wherein one or more gases are brought into contact with a liquid, and thereafter the liquid and any gases not dissolved in the liquid are separated, or to an improved device for separating solids such as dust or dirt from an air or other gaseous medium by first bringing the gaseous medium into contact with a liquid so that the solid particles are commingled with the liquid and wet thereby at least as to their surfaces, and then separating the solid laden liquid particles or wetted solids from the gaseous medium to bring the latter into a purified state.

This application is a continuation of our application Serial No. 571,795, filed March 15, 1956, and now abandoned.

The present invention is directed to a novel and improved means for bringing a gaseous medium and/or solid particles and a liquid into contacting relation, in combination with a novel and improved means for separating a liquid and/or wetted solid from a gaseous medium. We have found that by placing a conventional wire screen which has been folded into a zigzag or successive V's shape (conventionally stated, accordian pleated) with the wires thereof, which are mutually parallel and also parallel to the folds of the screen, so disposed that the gaseous stream has no rectilinear path through the screen from a point upstream of the latter at a point downstream therefrom, across a conduit through which a gas or mixture of gases are flowing at velocities of upward of about 3,000 ft. per minute, and by spraying a sufficient quantity of liquid from a point upstream of the screen into the screen, there is a substantially complete contacting of liquid and gas and wetting of any entrained solids. It is therefore a primary object of the present invention to provide a novel and improved means for wetting a gaseous medium and/or solid particles entrained therewith moving at high velocities.

In the application of the device of the present invention as a dust separator, as the gaseous medium entraining the dust or other foreign matter particles is moved through the novel screen unit of the present invention, substantially all of the dust particles are brought into contact with and are commingled with and wet by the liquid which is sprayed into the screen. It is therefore a more particular object of the invention to provide a novel and improved means for wetting the foreign matter particles which are suspended in a gaseous medium which is moving at high velocities.

Several forms of wet type separators wherein a liquid is to be separated from a gas or mixture of gases, heretofore have been disclosed. However, for the most part these involved the separation of the liquid from the gaseous medium either by reducing the velocity of the gaseous flow, whereby the liquid could be gravitationally removed therefrom, or by the use of various type impingement plates. The latter arrangement in particular has at least one serious disadvantage in that, if the velocity of the fluid stream passing through the impingement plate section is too great, there is reentrainment of the liquid in the gaseous stream and thus the latter is neither as dry nor as clean, as the case may be, as is most times desirable. Thus it has ben believed necessary with the use of impingement plate sections to reduce the velocity of gaseous flow sufficiently so as to eliminate the reentrainment of liquid in the gaseous medium. Reducing the velocity of the gaseous flow to effect such liquid separation, of course, leads to serious disadvantages in that either the capacity of the separator must be decreased over that which would result if the liquid could be separated from the gaseous medium at the higher velocity, or the liquid separating section of the separator must be of a substantially larger size than the other sections thereof. It is anothear of the primary objects of the present invention to provide an improved means for effectively removing substantially all liquid particles from a gaseous medium at velocities at least or about as great as that at which the gaseous medium is brought in contact with the liquid and at higher velocities than that at which the liquid particles could be removed effectively from the gaseous stream by impingement plate sections.

In the separator which we have developed, the means for separating the liquid particles from the gaseous medium includes in a preferred embodiment a cylindrical central core concentric with and lying within a generally outer cylindrical shell of the separator, thus providing an annular passage between the core and the outer shell. Means in the form of turning vanes are positioned adjacent the upstream end of the core to impart a vortical twist to the liquid laden gaseous stream. Similar arrangements, it will be recognized, have been used in dry type vortical dust separators, however the present separator in its application as a dust separator is not to be confused with these dry type vortical dust separators wherein the dust particles in a dry state are centrifugally thrown to the outside of the separator and collected by various means, as in the first place these dry type collectors are far less efficient with respect to the size of the solid particles which can be removed from the gaseous medium in which they are suspended, and further the problems arising in connection with removing the liquid from the gaseous stream are not present. In the present invention the liquid particles are thrown toward the outside of the separator and can, for the most part pass from the separator, through one or more openings in the outer shell thereof into suitable collecting spaces or sumps. A large percentage of the liquid can be removed in this manner, however in most instances it is desirable and/or necessary to remove a greater percentage of the liquid than can be removed by this means alone.

The removal of substantially all of the remaining liquid presents many problems and it is with respect thereto that further features and objects of the present invention are directed. More particularly, it is an object of the invention from this aspect to provide improved means for removing substantially all of the liquid from the separator with a minimum loss of energy. Another object of the invention is the provision of means for preventing any liquid from being carried along the inner core and subsequently being reentrained in the gaseous stream and carried through the separator and into the atmosphere. A more specific object of the invention is the provision of means for spinning at least a portion of the inner core to minimize the tendency of the liquid particles to come in contact therewith and to throw any liquid particles which do come in contact with the core back into the gaseous stream upstream from the collecting spaces. Still another more specific object of the invention is the provision of means for spinning at least a portion of the outer cylindrical shell to impart an increased tangential force to the liquid laden gaseous medium at the outer boundary of the latter.

Although from time to time as the description of the invention unfolds reference will be made to the applicability of the present invention as a chemical reactor or scrubber, for the most part reference will be made to the use of the illustrated device as a dust separator and particularly for the separation of dust from an air stream. In each of the embodiments of the present invention illustrated, whether the separator is adapted for use in a horizontal or in a vertical plane or with its axis in an inclined position, the separator is generally cylindrical in configuration with a fan or other means for moving the air through the separator preferably positioned adjacent the downstream end of the separator. Towards the upstream end of the separator there is positioned across the separator a conventional wire screen which has been folded into zigzag or successive V's shape, with the wires which are mutually parallel and also parallel to the direction of the folds of the screen lying in overlapping relation normal to the longitudinal axis of the separator, i.e. so positioned that there is no straight path parallel to the longitudinal axis of the separator through which the air can pass. A means for spraying a liquid such as water into the screen is positioned between the inlet of the separator and the screen, with the result that water in the area of the screen is contacted by the air and the dust particles suspended therein, the dust laden water particles and/or wetter dust particles thence being suspended in and carried downstream from the screen by the air stream. There is positioned downstream from the screen a closed, elongated, generally cylindrical core which is of a smaller diameter than and is concentric with the outer cylindrical shell of the separator, thus providing an elongated annular passage for the air and suspended water and dust particles. A series of turning vanes are positioned adjacent the upstream end of the core between the core and the outer shell, to thus impart a vortical swirl to the air. Due to the tangential velocity which is imparted to the air, the heavier dust laden water particles are thrown by centrifugal force to the outside of the annular space and are removed therefrom to a large extent through a series of longitudinally spaced circumferential openings in the outer shell. A cylindrical collecting chamber or sump encompasses said outer shell adjacent the openings in the latter, to direct the water from the separator. These chambers or sumps may be considered blind louvers as there is no air flow therethrough from one to another or from one to a point outside the shell. Adjacent the downstream end of the inner core there is provided a further means for removing the dust laden water particles and/or wetted dust particles which have been thrown to the radially outer boundary of the annular air space and have not been removed through the aforementioned openings. This means, in one embodiment of the invention, is in the form of a chamber into which the outer boundary layer of water laden air passes, and is formed by an inner cylindrical wall of a slightly smaller diameter than the cylindrical shell of the separator and an outer wall which flares radially outwardly and abuts at its upstream end said cyindrical shell, the latter being broken away throughout the length of the latter chamber. The skimmed outer boundary layer of water laden air thus flows into a chamber the outer boundary of which is frusto-conical and the inner boundary of which is cylindrical, with the result that the axial component of the velocity of the skimmed air stream is gradually decreased and the water thus separated from the air by gravity or by being centrifugally thrown to the outside of the chamber, passes through openings in the outer frusto-conical wall. In one form of the device a series of longitudinally spaced annular baffles are secured between the outer frusto-conical wall and the inner cylindrical wall, while in a second form a spiral is positioned between the walls to direct the water, which is gravitationally separated, to the openings in the outer wall. Due to the gradually increased area of the chamber and consequently a gradual decrease in velocity pressure and corresponding increase in static pressure within the chamber, a substantial part of the kinetic energy of the bled-off air is recovered and the air is directed from said chamber back into the main air stream. The cleaned air is then passed through a series of straightener vanes and into the fan which pulls the air through the separator. The presence of water which normally tends to adhere to and be carried downstream along the inner core and become reentrained in and carried to the atmosphere in the air stream is minimized, and any water which does come in contact with the inner core is removed therefrom, by rotatably mounting the core and providing means for the rotating thereof. The core is rotated by the air in the same general direction as the air flow and for this purpose a series of circumferentially spaced vanes are secured to the core. By spinning the core in the same general direction as that of the air flow, it will be recognized that the difference between the tangential velocity component of the air intermediate the inner and outer boundary of the annular air space and the tangential velocity component of the air at the inner boundary thereof adjacent the inner core is substantially eliminated, with the result that substantially all of the water which would normally tend to come in contact with the inner core remains in the air stream and is thrown to the outside as aforementioned by centrifugal force. On the other hand, any water which comes in contact with the spinning inner core is thrown outwardly by centrifugal force and in the same general direction as the air is moving, with the result that these water particles are also thrown to the outside of the separator and collected by one of the abovementioned means. In a second embodiment of the invention, in place of the aforedescribed chamber for skimming the outer boundary layer of air and water from the shell, a short section of the outer shell is mounted on the rotatable section of the inner core for rotation therewith. Openings in the outer shell are provided adjacent the longitudinally spaced ends of the spinning portion thereof and a plurality of arcuate openings are provided in the rotatable shell section, with the result that with the tangential component of the velocity of the liquid laden air stream at the outer boundary of the space between the inner core and the shell being substantially the same as the tangential component of the velocity at points intermediate the inner core and outer shell, the fluid in the outer boundary is thrown centrifugally through the openings in the shell and into the aforementioned collecting chamber or sump which encompasses it.

Other objects and advantages will be apparent from the following detailed description of the several embodiments of our invention read in conjunction with the accompanying drawings in which.

Referring now specifically to the drawings and first to the embodiment of the invention shown in FIGS. 1–7, the reactor and/or separator is generally cylindrical in configuration and comprises an elongated generally open-ended cylindrical shell 11, a generally cylindrical closed inner core 12 and a generally cylindrical liquid collecting section 13 encompassing a portion of the shell 11 intermediate the ends of the collector. Air or other gaseous media is drawn into the left end of the separator or collector, as viewed in FIGS. 1 and 4a, and is moved through the separator by means of a fan 14 mounted in the downstream or discharge end thereof. The fan may be of a conventional type, with a plurality of circumferentially spaced blades 15, the radially outer surfaces of which lie in close proximity to the outer shell of the separator, mounted on a hub 16 which is driven by a motor 17. As will presently be described, the separator of the general type which is the subject of the present invention is operative both as a horizontal collector and as a vertical collector, however present reference will be made to a separator which is operating in a generally horizontal position.

Although it will be appreciated by those skilled in the art that separators of this type have application in various sizes and for various capacities and that the dimensions used in the foregoing description are merely for purposes of illustration, the separator as illustrated and described is designed to handle about 5,000 cubic feet of air or other gaseous media per minute at velocities on the order of 3,000 feet per minute or higher. To accommodate such fluid flow we have found that a cylindrical unit which is approximately 17½ inches in diameter, i.e. the inner diameter of cylindrical shell 11 is approximately 17½ inches, with a resulting cross sectional area within shell 11 of approximately 1⅔ sq. feet, is adequate in cross sectional area. It will be appreciated that the fan 14 can vary in size depending upon the desired capacity of the unit and the velocity of flow therethrough, and for present purposes of illustration, fan 14 can, as aforementioned, be said to be one of conventional construction and about 15 horsepower.

The air or gaseous medium which is being pulled into the separator at a velocity of 3,000 or more feet per minute first passes through a screen unit 20 which may be called an admixing screen. The herein removable screen unit 20 is self-contained and can be secured in place substantially normal to the flow of air by means of threaded elements 21 passing through the screen frame and annular flanges extending radially outwardly from sections of shell 11 on either side of the screen. In the screen area the dust laden air is brought into contact with a liquid such as water which is sprayed from a spray nozzle 22 at a point upstream of the screen toward the screen. It will be understood that the spray can be directed at any angle away from the screen so that the air carries the liquid droplets into the screen. Nozzle 22 is substantially centrally located, i.e. substantially aligned with the central longitudinal axis of the separator, and is secured at the lower end of a pipe or suitable conduit 24 through which water is conducted under pressure from a suitable supply source, not shown.

The screen unit 20 is made up of conventional commercial screening which is folded to form a zigzag or successive V's configuration. With the screen folded in this manner the individual wires of the screen lie in a chordal relation to the cylinder 11 and form two series of mutually spaced and mutually parallel wires, one series lying normal to the other and being parallel to the folds of the screen. We have found that conventional wire screen is satisfactory for use in this type separator, although the spacings between the wires which are normal to the folds of the screen can be a much greater distance apart, as they serve primarily only to hold the other series of wires in place and provide a rigid structure. The screen unit is so formed that the individual vertically disposed wires 29 of the screen which are parallel to the folds of the screen lie in longitudinally spaced relation but with their projections on planes normal to the longitudinal axis of the separator in overlapping relation, with the result that there is no free rectilinear path parallel to the longitudinal axis of the separator through which the air can travel, the air having to curve or bend, as shown by use of curved arrows in FIG. 3, to pass through the screen unit 20.

We have found that to insure a complete mixing of the dust particles with the water droplets which are formed in the screen area that between about 1/10 (one-tenth) and about 2 (two) gallons of water is necessary for each 1,000 cubic feet of air flow. It will be appreciated that if too little water is sprayed into the screen unit, an incomplete wetting of the dust particles by the water will result, but that the ability of the dust particles to mix with the water, will not decrease if surplus amounts of water are sprayed into the unit. However, obviously, due to economic considerations, both as to the cost of the water which is used and the cost of handling same, and due to the additional power required to pull the surplus water through the unit, it is desirable that only enough water be sprayed into the screen unit so that substantially all of the dust particles are wetted by the water. The role of the spray water is three-fold. The water film on the collecting wires helps to retain the dust particles which impinge thereon thus obviating any reentrainment of the dust particles in the air. The constant flow of the water through the screen keeps it flushed of dust and sludge. Finally, though the water on the wires involves by its presence some pressure loss, the fact that it assumes an air foil form minimizes the loss that the wet coating of the wires occasions. This latter feature is most important at high velocities.

Although we do not fully understand the action of the water and the air in the area of the screen, and although we do not wish to be bound thereby if the theory proves wrong, one theory which has been advanced as to the operation of the collecting element, known herein as the admixing means or screen, is that of impaction, i.e. the impaction of the dust particles on the wires of the screen by inertial forces. It is well known that if a dust particle is carried in an air stream which is to be intercepted by a fixed surface, the particle will follow a course intermediate two extremities, i.e. between one in which it remains in its relative position in the air stream and thus curves with the air away from the fixed object and one in which it contacts the object, thus leaving its relative position in the air stream. In the former course, the inertial forces acting on the particles are negligible compared with the viscous forces, while in the latter course the inertial forces, due to the mass of the dust particles, are of the same order of magnitude as or of a greater order of magnitude than the viscous forces, and as the dust mass is greater than the air mass, it assumes its own trajectory.

A simple relation for the impaction of dust particles on a flat fixed object in an air stream is found by equating the viscous forces to the inertial forces. Since the viscous force, according to Stokes' Law which is applicable to particles between 3 and 100 microns in diameter is $$F_s = 3\pi\mu D u$$

and the centrifugal force is $$F_c = \frac{D^3}{6}\pi\rho\frac{u^2}{R}$$

then one can arrive at an impaction value which is equal to $$\frac{D^2 \rho \mu}{18\mu R}$$

where $D$=particle diameter, $\rho$=density of the particle, $u$=velocity of the air stream and of the particle, $\mu$=viscosity and $R$=radius of curvature.

It can be seen from the above formula that the collection increases as the wire diameter decreases and thus the radius of curvature decreases, and as the square of the particle diameter and the velocity increase. We have found that by the present invention and the use of the aforementioned admixing means that all particles greater than 3 microns will be captured by impact on 0.01 inch diameter wires when the dust laden air is flowing at about 5,000 feet per minute.

In the present invention the intercepted wires are positioned normal to air flow in a most efficient manner, i.e. every wire normal to the flow has the highest impact duty relative to its contribution to pressure drop, i.e. energy loss. Similar collectors heretofore have been composed of random packed wires or wire screen, with the individual wires or fibers having low impaction duty relative to their contribution to the total pressure drop. For example, fibers or screen elements which are directly in line with the air flow constitute a condition of duplication since theoretically the second, third, etc. elements in line intercept the same cross section of the air stream as the leading elements, hence being of equal diameter the second, third, etc. elements contributing substantially nothing to the inertial collection of particles in the air stream while adding substantially to pressure drop.

In the present invention a controlled amount of overlap is maintained and whereas flat or concave surfaces normal to air flow are the best media for inertial impact, the round wires which are more economical can be used with substantially as good effectiveness. The outside segments of the round wires do not present good impacting surfaces due to the fact that the air stream has a larger turning radius toward the outermost sides of said wires. Accordingly the wires are overlapped a certain amount, say at least about ⅓ to thus, as aforementioned, provide an admixing means in which there is no free rectilinear path through said screen parallel to the longitudinal axis of the separator, through which the air can travel.

In actual practice the stepped echelon arrangement of these wires is most easily realized by shaping commercial wire mesh into multiple or successive V's. The efficiency of the area normal to the air flow is maintained at a maximum by this configuration due to the fact that the effective open area or the free area on a plane normal to the air flow in any position in the screen is maximum. It can be realized that dense, or low open area, screens are not as suitable for use in these multiple or successive V's as are small wire, larger mesh screening. It is important for operational efficiency that the stream lines not be compressed due to the mesh opening being smaller in cross sectional area than the allotted frontal area of the air flow as it passes by the previous wire, as otherwise the pressure drop would increase with no added collection benefit.

It will be understood that in most instances in using the device of the present invention the mass of water is larger than the mass of dust commingled therewith, however in some instances the mass of dust may be larger than that of the water and then it more accurately can be said that the dust particles are merely wetted. As the terms dust-laden water particles or foreign matter-laden liquid particles are used hereinafter in the specification and claims, it will be understood that they include either or both particles in which the mass of liquid is greater than that of the foreign matter commingled therewith or less than that of the foreign matter.

Figure 4A:
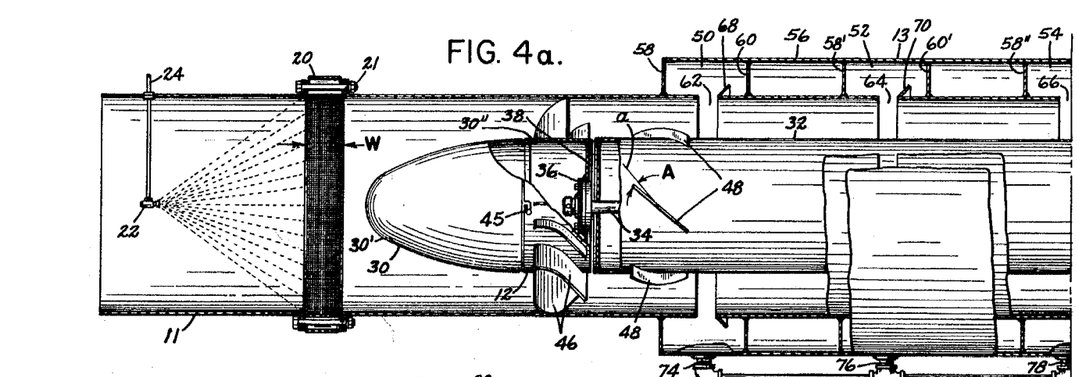
FIGURES 4a and 4b are enlarged views in longitudinal section with parts in elevation taken on the plane of line 4—4 on FIG. 2.
Figure 4B:
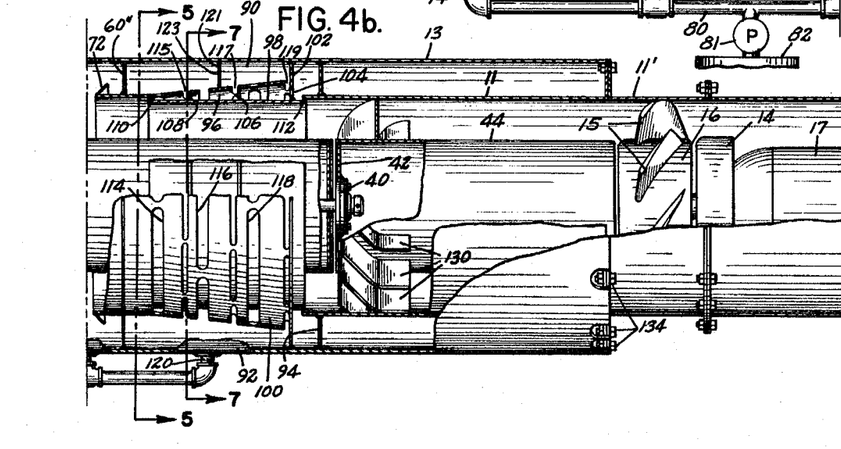
Figure 5:
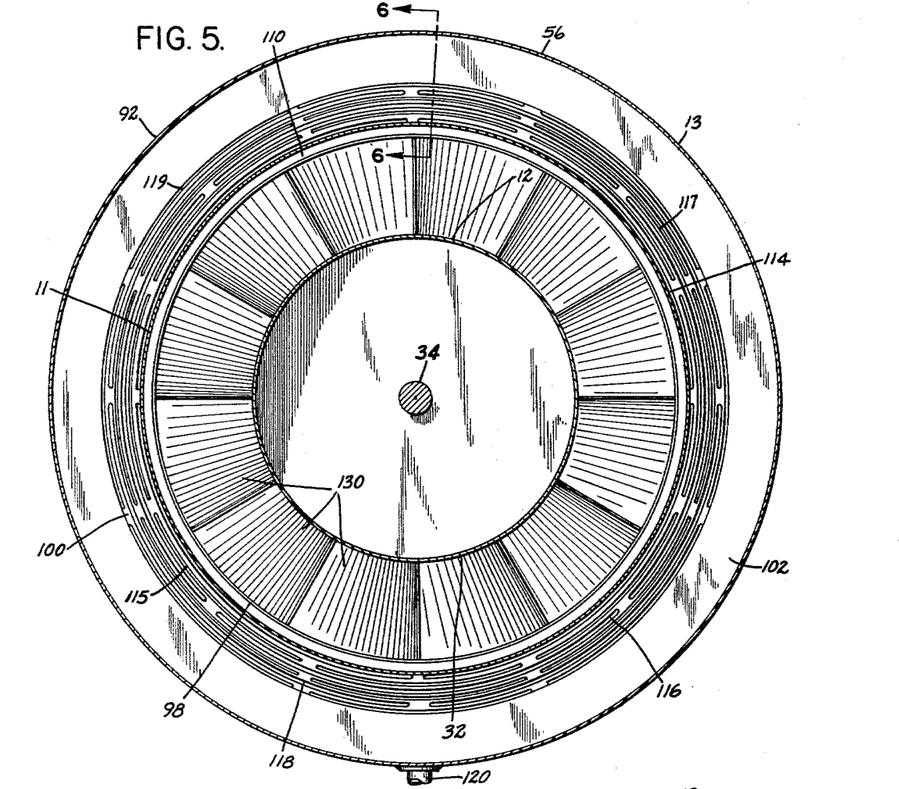
FIGURE 5 is a transverse sectional view taken on the plane of line 5—5 on FIG. 4b, however on a larger scale.
Figure 6:
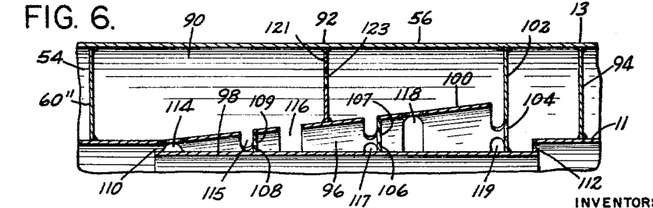
FIGURE 6 is a sectional view taken on the plane of line 6—6 on FIG. 5.

The wet air which flows outwardly from the screen unit 20 next passes into the zone of the closed inner core 12 and more particularly into the annular space provided between the inner core and shell 11. The inner core 12 is made in three sections, the upstream or left hand one 30, as viewed in FIG. 4, being stationary and being securely held within and in spaced relation to the shell 11 by means of a series of vanes 46 which will presently be described. The intermediate section 32 of the inner core is rotatably mounted by means of a shaft 34 which is suitably journaled at its left end in bearing brackets 36 which are secured to an end wall 38 of the stationary core section 30, and at its right end in bearing brackets 40 which are secured to an end wall 42 of a third section 44 of the inner core, the latter section also being stationary. It will be noted that the upstream end 30' of the stationary core section 30 is dome shaped, portion 30' being secured to the cylindrical portion 30'' of section 30 by means of a lock joint 45. We have found that by placing a core of approximately 10½ inches in diameter within the cylindrical shell the effective area through which the air flows, i.e., the cross sectional area of the annular space between core 12 and shell 11, is about 1.07 sq. feet. This reduced area obviously produces an increase in the velocity of the air and where the velocity of the entering air is about 3,000 ft. per minute, the decreased area through which it flows increases its velocity to about 4,675 feet per minute.

The vanes 46 aforedescribed as securing the core section 30 to shell 11 also serve as turning vanes to impart a twist to the air. As will presently be discussed, the turning vanes may be placed at different angles with respect to the horizontal axis of the separator, but for present discussion vanes 46 may be assumed to be equiangular at all points intermediate the inner core and outer shell and to be positioned so as to turn the air at an angle of about 45° from the longitudinal axis of the separator. The air thus leaves the turning vanes with a tangential velocity, as well as an axial velocity of about 4,675 ft. per minute, and a resultant velocity in the direction of flow of about 6,610 ft. per minute. It will be recognized that due to the vortical action of the air, the water particles are thrown to the outside of the annular space between the core and the shell 11. It will further be recognized that due to the increased velocity over that at which the air enters the collector, the water particles will be thrown to the outside at a greater rate and over a shorter length of the collector than if the water separation were effected at the same velocity as that at which the air entered.

For the purpose of collecting the water which is thus moved to the periphery of shell 11, the annular collecting section 13 is formed with a series of annular collecting spaces 50, 52 and 54. Each of these spaces is bounded by an outer wall portion 56 and by side walls 58 and 60, the reference numerals 58' and 60' being used to designate the side walls of space 52 and reference numerals 58'' and 60'' to designate the side walls of space 54. The sidewalls 58, 58', 58'', 60, 60', and 60'' are secured as by welding between the outer wall 56 and the shell 11 to thus support the former in spaced relation with respect to the latter. The shell 11 is cut away to provide openings 62, 64 and 66 which communicate with the space between the inner core 12 and the outer shell 11 and the respective collecting spaces 50, 52 and 54. Angular shaped annular baffles 68, 70 and 72 are positioned adjacent the downstream edge of the respective openings 62, 64 and 66 to thus trap any water which might tend to flow back into the space between core 12 and shell 11 due to the circulation of air within the collecting spaces. The water runs downwardly around the outer periphery of shell 11 and is pumped by means of a suction pump 81 through drain conduits 74, 76 and 78, which connect spaces 50, 52 and 54, respectively, with a common line 80, and into a suitable receptacle shown schematically at 82.

It will be appreciated that the passage of water into the collecting spaces 50, 52 and 54 is on a probability basis, i.e., the amount of water which is collected in each space is in the neighborhood of 60% of the water which has been moved to the periphery of the shell in the area of the respective openings 62, 64 and 66. It will also be recognized that there is a direct relation between the tangential component of the velocity of the air, which component can be controlled in part by the angle of the turning vanes 46, and the length of the separator required to insure that water particles of a certain size are moved to the periphery of shell 11. For example, with an entering velocity of 3,000 feet per minute and the turning vanes at about a 45° angle to the longitudinal axis of the separator a distance of 42 inches between the turning vanes 46 and collecting chamber 54 is sufficient to allow for the movement of substantially all water particle sizes of 50 microns and larger to the periphery of shell 11. If it were desired to remove water particles of smaller sizes or to decrease the length between the turning vanes and the collecting chamber 54, one could increase the tangential component of the velocity of the air by placing the turning vanes 46 at an increased angle to the longitudinal axis of the separator.

The air which moves downstream past the collecting space 54, because 100% of the water at the periphery of the shell in the area of space 54 does not flow into that space, will still contain a small amount of water, this water being carried principally near the outer boundary of the annular space between the inner core 12 and outer shell 11. For the purpose of removing the last of the water from this boundary layer of air, a final collecting space or sump designated generally 90 is provided. Sump 90 is surrounded by an outer cylindrical wall 92, which is a continuation of the outer wall 56 of collecting spaces 50, 52 and 54, and end partitions 94 and 60" secured between the outer circumferential wall 92 and shell 11, as by welding or the like. Throughout substantially the entire length of the space 90 the outer shell 11 is broken away and there is provided a further cylindrical wall 98 which is of a slightly smaller diameter than that of shell 11. Abutting the shell 11 adjacent the upstream end of the cylindrical portion formed by the wall 98 is a further wall 100 which flares in a radially outward direction as it extends downstream, i.e. toward the right end, as viewed in FIGS. 4a, 4b and 6, of the sump 90. The wall 100 thus is frusto-conical in confiugration and is secured at its right end by welding or the like to a further partition 102 secured between walls 92 and 98. It will be noted that partition 102 is provided with a series of circumferentially spaced openings 104 adjacent its inner periphery, with a similar series of openings 107 and 109 being provided in partitions or walls 106 and 108 respectively, the latter partions being secured in longitudinally spaced relation between walls 98 and 100.

Figure 7:
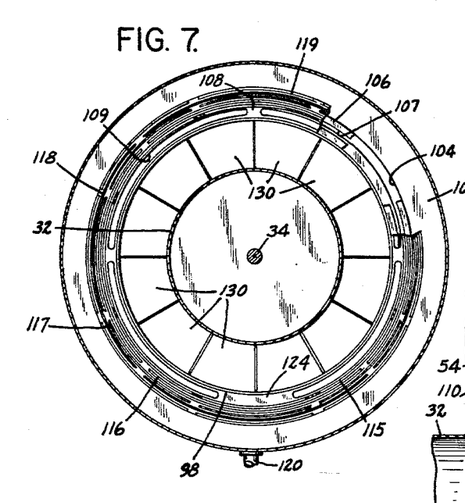
FIGURE 7 is a transverse sectional view taken on the plane of line 7—7 on FIG. 4b, however on a larger scale and with parts broken away and in full.

It will be understood that the boundary layer of air as it approaches the annular opening 110 between the walls 98 and 100 will tend to flow through this opening and into the space or chamber 96 between walls 98 and 100 due to the kinetic energy from the impact head which is created at this opening, the pressure drop between the upstream end of the cylindrical wall 98 and the downstream end thereof, and the drag from the shear force adjacent the opening 112 through which the air flows back into the path between the inner core 12 and the shell 11. As is best to be noted in FIG. 6, the openings 109, 107 and 104 in the respective plates 108, 106, and 102 are so positioned that each plate has a circumferential baffle portion extending outwardly from the cylindrical wall 98 and a circumferential baffle portion extending inwardly from the tapered wall 100, with the result that water which is thrown by centrifugal force toward the outer portion of the space 96 tends to hit against the outer baffle portions of these plates and be carried outwardly through openings 115, 117 and 119 in the wall 100 into the collecting space 90. One or more annular baffles 121 having arcuate slots 123 therein may be secured in sump 90 and positioned normal to the longitudinal axis of the separator to insure that the water is removed from the small amount of air circulating within sump 90. Additional openings 114, 116 and 118 are provided in wall 100 for this purpose. On the other hand, due to the increasingly larger area provided between walls 98 and 100, it will be recognized that the axial component of the velocity of the air flowing in that space will be decreased with an increasing tendency for the water particles to drop out of the air by gravity. The inner portions of plates 102, 106 and 108 prevent this water from being carried further downstream and cause it instead to drain around the cylindrical wall 98 and into the drain conduit 120 which connects with the aforementioned main drain line 80 and receptacle 82 through suction pump 81. As can be seen in FIG. 7, the slots in the plates 102, 106 and 108 are arranged so that there is a solid arcuate length of these plates, designated at 124, adjacent the bottom of the collector, with the result that the water which is draining around the outer portions of plates 102, 106 and 108 will not drop down through the air which is flowing through the openings in these plates but rather will flow freely along the plates and especially portions 124 thereof and into drain conduit 120. It will be recognized that because of the gradual increase in area within the space between the cylindrical wall 98 and the frusto-conical wall 100 the velocity pressure drop will be gradual and therefore there will be a much smaller loss in kinetic energy than if the skimmed off air were directed into a large space with a sudden velocity pressure drop, with the result that in the device illustrated a large portion of the kinetic energy of the skimmed off air is recovered and put back into the main air stream.

The small air flow which has passed through the area between the walls 98 and 100 moves as aforementioned downstream through the opening 112 between the cylindrical wall 98 and the shell 11 and is reunited with the main air stream passing between the inner core 12 and the shell 11. The united air stream then passes through a series of straightener vanes 130 which are mounted in circumferential spaced relation between the inner core portion 44 and the shell 11 for the purpose of recovering the turning energy of the air. The straightener vanes 130 remove the tangential component of the velocity of the air and the air flows with a substantially wholly axial velocity downstream from that point. Downstream from the straightener vanes 130 shell 11 terminates in an annular flange to which an annular flange of the cylindrical wall 92 and a flange of the shell portion 11' of the shell 11 are secured in any conventional manner, as for example by a plurality of circumferentially spaced threaded connecting elements 134. The inner core 12, on the other hand, terminates adjacent hub 16 of the fan 14, with the result that the air is drawn into the fan 14 and the blades 15 thereof adjacent the end of the core 12. The fan thus moves the air outwardly through the end of the shell portion 11' which surrounds the fan motor and to the atmosphere. It will be recognized that if desired, the straightening vanes 130 can be eliminated and the air flowing in a vortical path brought directly into fan 14. The blades 15 of the fan then, of course, will be designed to handle the air flowing in such a path.

Figure 1:
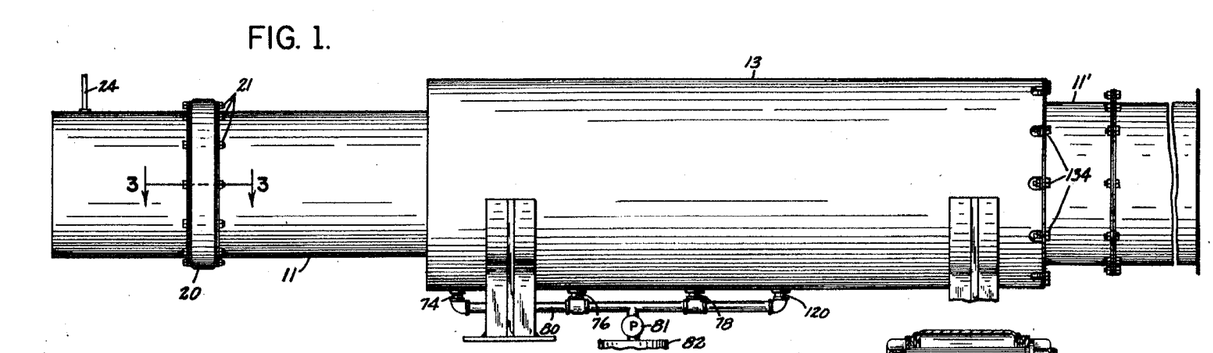
FIGURE 1 is a view in elevation of a separating device according to the present invention.
Figure 2:
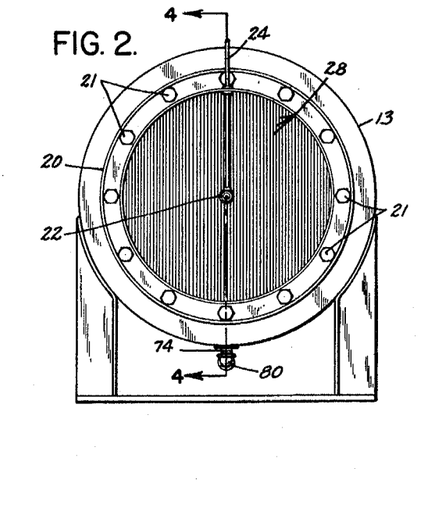
FIGURE 2 is an end view of the separating device looking from left to right in FIG. 1.
Figure 3:
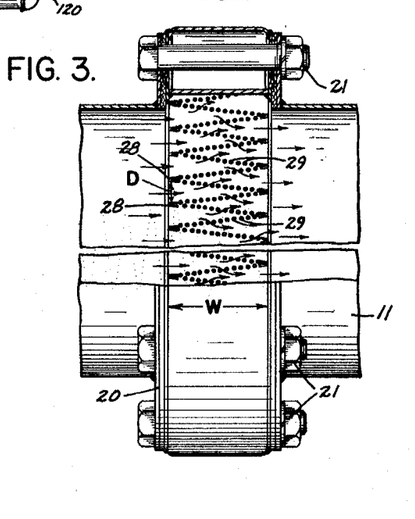
FIGURE 3 is a view partly in plan and partly in horizontal section taken on the plane of line 3—3 on FIG. 1, however on a larger scale.

One important problem in wet type dust separators, wherein the dust laden water particles are separated from the air by the vortical action of the air and wherein there is a central core, is the tendency for water to collect on the core, be carried downstream along the surface thereof, and subsequently be reentrained in the air stream and carried out to the atmosphere. Although the amount of water which tends to collect on this inner core is small by comparison to the amount of water put into the unit, the removal thereof is nevertheless a very real problem since, in most instances, the air must be drier and cleaner than that which would result were this dust laden water carried through the separator. It is for the purpose of avoiding this difficulty that the intermediate section of the inner cylindrical core is rotated. To effect the rotation or the spinning of the inner core a plurality of circumferentially spaced vanes 48 are secured, according to the preferred embodiment of the invention, adjacent the upstream end of the core section 32. Vanes 48 are positioned at an angle of about 3 to 7° removed from the path of the air flow, i.e. angle A between vane 48 and the path of the air, shown as $a$ in FIG. 4a, is 3–7°, with the result that the inner core section 32 is spun clockwise, as viewed from the left end of the separator as shown in FIGS. 1 and 4a, or in effect in the same general direction as the flow of the air stream.

The object of spinning the inner core is two-fold, first to effect substantially the same rotational or spinning velocity at the surface of the inner core as that of the tangential component of the velocity of the fluid medium outwardly therefrom to reduce the tendency of the water particles in the inner boundary layer from coming in contact with the core, and second to throw any water particles which do come in contact with the inner core out into the air stream and toward the outer boundary of the air space between the core and shell. As a practical matter we have found that substantially all of the water, which would normally come in contact with the inner core adjacent its upstream end and be carried along the core, is maintained or thrown clear of the core and is collected in one of the collecting sumps 50, 52, 54 and 90.

From what has been illustrated and described above it can readily be seen that due to the improved means of commingling the dust particles with water particles and due to the improved means of separating all of the water and water wet dust of predetermined particle size from the air, we have produced a separator which is not only efficient but also one which is compact, economical to build, can be operated in any plane, and can with slight changes in dimension and blade angles be adapted to meet the demands of varied operations and varied collecting conditions.

Figure 8:
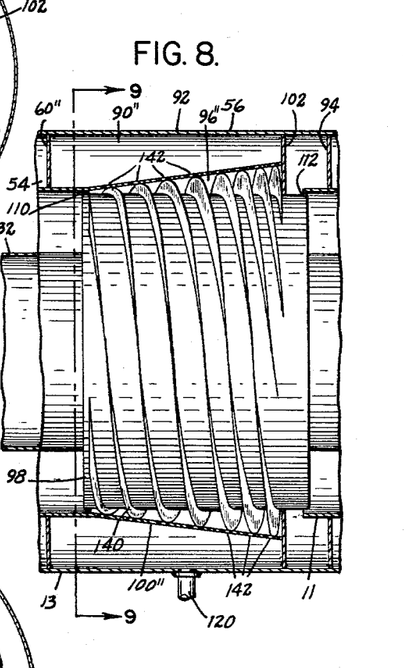
FIGURE 8 is a fragmentary view in longitudinal section with parts in elevation of a modified liquid separating means according to the present invention.
Figure 9:
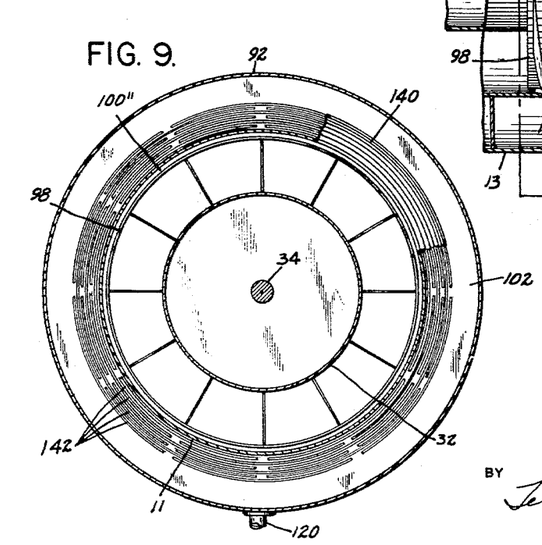
FIGURE 9 is a transverse sectional view taken on the plane of line 9—9 on FIG. 8 with parts broken away and in full.

There are shown in FIGS. 8 and 9 certain details of another embodiment of the invention and particularly of the means for removing the water from the air in the area of the sump 90″. Chamber 96″ is similar to chamber 96 of FIGS. 6 and 7. In place of the several baffles such as 106 and 108 and the openings therein, there is provided a spiral ribbon or plate 140 secured between the inner cylindrical wall and the outer frusto-conical wall 100″. Spiral 140 increases in radial thickness as it progresses downstream with the successive spirals being closer together to coincide with the gradually decreasing axial component of the velocity of the air within this space. As a result of the presence of the spiral 140, the air which enters the space between cylindrical wall 98 and the frusto-conical wall 100″, due to its combined tangential and axial velocity, moves in a spiral path between the spiral sections of plate 140, with those water particles which are thrown outwardly by centrifugal force passing through the openings 142 in the frusto-conical wall 100″, and those water particles which gravitationally drop out of the air, as the velocity within the space decreases, collecting on and running around the sections between the spiral plate 140 and into the sump 90″, and finally being drained therefrom through the drain line 120.

Figure 10:
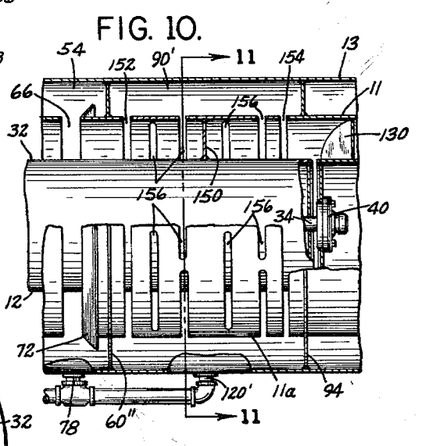
FIGURE 10 is a fragmentary view in longitudinal section with parts in elevation of another modification of a liquid separating means according to the present invention.
Figure 11:
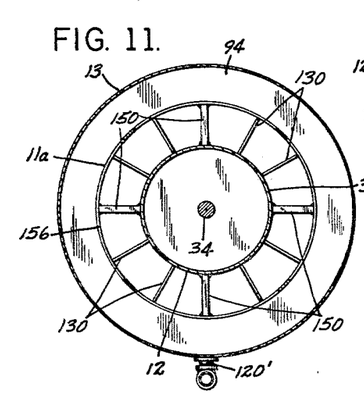
FIGURE 11 is a transverse sectional view taken on the plane of line 11—11 on FIG. 10.

There is shown in FIGS. 10 and 11 a further modification of a means for removing the remaining portion of the liquid which flows primarily in the outer boundary layer of air between core 12 and shell 11 and which does not pass into one of the sumps 50, 52 or 54. In this form a section 11a of the outer cylindrical shell of the separator is independent of and spaced a distance apart at each end from the remainder of the shell. Shell section 11a is mounted on the rotatable inner core section 32 by means of a plurality of circumferentially spaced spokes 150, there being shown four such spokes. As is best noted in FIG. 10, annular openings 152 and 154 are formed adjacent the upstream and downstream ends of the rotatable shell portion 11a and there are also formed in the cylindrical shell portion 11a a number of longitudinally spaced series of circumferentially spaced arcuate openings 156. It will be appreciated that with the shell portion 11a secured to the spinning portion 32 of the inner core, the latter shell section will rotate at the same angular speed as the rotating inner core section, with the result that the tangential component of the velocity of the fluid stream at the outer boundary of the space between core section 32 and shell 11a, i.e. adjacent the periphery of section 11a, will be increased over that of the outer boundary at a point upstream from section 11a and will approximate the tangential component of the velocity of the fluid stream at points intermediate the inner core and outer shell. The water in the outer boundary in the area of section 11a is thus thrown by centrifugal force through the several openings 152, 154 and 156 into the sump 90′ from which it can be drawn under suction through a drain line 120′ in a manner similar to that previously discussed in connection with the embodiment of FIGS. 1 through 7. With this latter arrangement it will be appreciated that due to the increased tangential force applied to the liquid at the outer boundary by the spinning of shell section 11a, substantially all the water remaining in the air stream will be thrown to the outside of the cylindrical shell. Although there is illustrated in FIGS. 10 and 11 a plurality of spokes for supporting the rotatable outer shell section 11a on the rotatable inner core section 32, it will be appreciated that in place of these spokes a plurality of circumferentially spaced blades lying at the same angle as vanes 48 could be used in place of the spokes to help rotate said rotatable core and shell sections. As a matter of fact, vanes or blades placed at the same or a similar angle as blades 48 could be used in place of the spokes 150 solely to effect the rotation of both the rotatable inner core and outer shell sections and vanes 48 eliminated.

Figure 12:
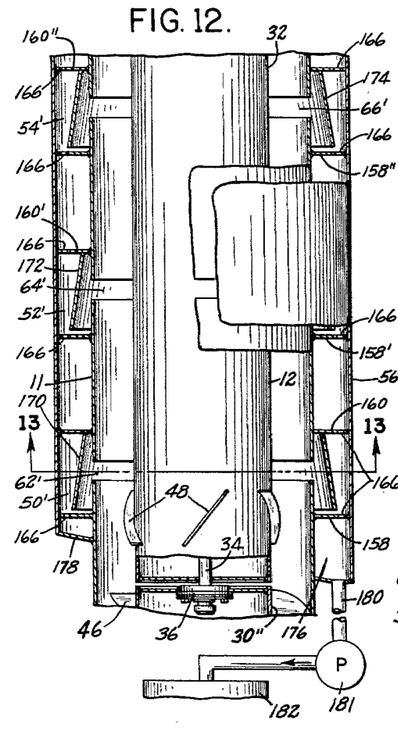
FIGURE 12 is a fragmentary view of a device according to the present invention applicable particularly in a substantially vertical plane.
Figure 13:
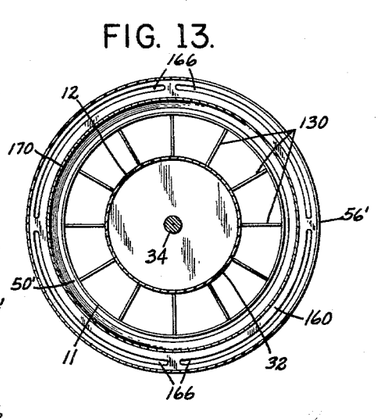
FIGURE 13 is a transverse sectional view taken on the plane of line 13—13 on FIG. 12.

There is illustrated in FIGS. 12 and 13 a separator similar to that previously herein described and illustrated, however with minor changes to facilitate its use in a substantially vertical or inclined plane. The parts which are the same in each form will be identified by like reference numerals. It will be noted from these figures that when the separator is used in a substantially vertical plane the drain line designated 180 is also vertically aligned with respect to the separator. The several partitions 158, 160, 158′, 160′, 158″ and 160″ between collecting sumps or chambers 50′, 52′ and 54′ are formed with openings 166 adjacent their radially outer edges, i.e. adjacent outer wall 56′ of the cylindrical collecting space which encompasses the shell of the separator. The separator unit disclosed in FIGS. 12 and 13 and the operation thereof in a vertical plane is, for the most part the same as that disclosed and described as operating in a horizontal plane, with a large percentage of the water which is thrown to the outside of the space between the core and the shell passing through the several openings 62′, 64′ and 66′ and into the respective collecting chambers 50′, 52′ and 54′. To reduce the possibility of circulation of air through the several collecting chambers frusto-conical shaped baffles 170, 172 and 174 may be provided and positioned within the respective chambers 50′, 52′ and 54′. It will be noted that the water which passes through the outer shell 11 into these collecting chambers can flow downwardly through the openings 166 in the several partitions between the collecting chambers, along the radially outer surfaces of the several baffles 170, 172, and 174, and into a collecting chamber 176, the lower wall 178 of which is inclined. A pump 181 may be used to move the water out of the collecting chamber into the sump 182 if desired.

As aforementioned, although the device of the present invention has been described for the most part for use as a dust separator and particularly for separating dust or other foreign particles from an air stream by bringing the air into contact with water and subsequently separating the water particles from the air stream, it will be appreciated that the device is equally as applicable as a chemical scrubber or reactor. When used in the latter mode, frequently, although we do not wish to be bound by such specific reference, one or more gases, one or more of which may be soluble in a liquid are moved through the admixing space and the liquid sprayed into said space, and thereafter any of the gas or gases which are not completely dissolved in the liquid are separated from the liquid. The application of the device as a chemical scrubber is much the same as that of a dust collector, with the gases with any solids suspended therein being brought in contact with, commingled with and wetted by a liquid in the zone of the admixing means, and consequently the liquid particles and wetted solids are removed from the gaseous stream downstream, therefrom. It will be recognized that regardless of the specific application of the device, the problems aforediscussed in connection with obtaining a complete admixing of gases and liquid and in connection with separating the liquid and/or wetted solids and gaseous mediums are solved.

While there are in this application specifically described several forms which the invention may assume in practice, it will be understood that these forms of the same are shown for purposes of illustration and that the invention may be modified and embodied in various other forms without departing from its spirit or the scope of the appended claims.

What we claim is:

1. An elongated open-ended shell, the various cross sections through which on planes perpendicular to its axis are all circular, and between longitudinally spaced points in which during use a pressure differential exists and into which a gaseous stream flows, means for subjecting said gaseous stream to liquid contact whereby the gaseous stream is brought into contact with and wetted by said liquid, an elongated core having at least a portion thereof concentric with and of smaller cross sectional area than said shell and positioned within the latter downstream from said last means, thus providing a space between said core and said shell, said core having at least one stationary section and one rotatably mounted section downstream from said at least one stationary section, means fixed between said stationary core section and said shell for imparting a vortical swirl to said wetted gaseous stream, means on at least a part of said core for rotating said rotatably mounted core section in the same general direction as said gaseous flow, and means providing for the removal from said shell of liquid thrown to the outside of said space.

2. A device for separating foreign matter from a gaseous medium, including an elongated open-ended generally cylindrical shell, means for moving a gaseous stream through said shell, means for subjecting said gaseous stream to liquid contact whereby the particles of foreign matter are brought into contact with and commingled with liquid particles, a stationary core lying within and in spaced relation to said cylindrical shell, said core being positioned downstream from said last means, a second core generally axially aligned with said first core and concentric with and of a smaller diameter than said shell, the disposition of said cores providing an annular space between said second core and said shell, means secured between said first core and said shell for imparting a vortical swirl to said gaseous stream, means for rotatably mounting said second core within said shell, means on at least a part of said core for rotating said second core in the same general direction as said air flow, and means for removing the water particles thrown to the outside of said annular space from within said shell.

3. A separating device as in claim 2 in which said means for rotating said second core includes a plurality of circumferentially spaced vanes fixed to said second core.

4. A device for separating foreign matter from a gaseous medium, including an elongated open-ended generally cylindrical shell, means for moving a gaseous stream through said shell, means for subjecting said gaseous stream to liquid contact whereby the particles of foreign matter are brought into contact with and commingled with liquid particles, an elongated core of a smaller diameter than and concentric throughout at least substantially its entire length with said cylindrical shell, said core being positioned downstream from said last means and providing an annular space between said core and said shell, said core being made up of a plurality of axially aligned sections an intermediate one of which is mounted for rotation relative to the other sections, means adjacent the upstream end of said core for imparting a vortical swirl to said gaseous stream, means on at least a part of said core for rotating said intermediate core section in the same general direction as said air flow and means for removing the water particles thrown to the outside of said annular space from said shell.

5. A separating device as in claim 4 in which said means for rotating said intermediate core section includes a plurality of circumferentially spaced vanes fixed to said latter core section.

6. A separating device as in claim 4 in which said means for rotating said intermediate core section is energized by the air flowing through said separating device.

7. A device for separating foreign matter from a gaseous medium, including an elongated open-ended, generally cylindrical outer shell between longitudinally spaced points in which during use a pressure differential exists, means for subjecting said gaseous stream to liquid contact whereby the particles of foreign matter are brought in contact with and commingled with liquid, an elongated core having at least a part thereof concentric with and of a smaller diameter than said cylindrical shell and positioned within the latter downstream from said last means, thus providing an annular space between said core and said shell, means adjacent the upstream end of said core for imparting a vortical swirl to said gaseous stream, means for removing the liquid particles thrown to the outside of said annular space, said last means including at least one arcuate opening in said outer shell at a point downstream from said swirl imparting means, said means for removing the water particles thrown to the outside of said annular space also including a further means having an inner cylindrical wall of a slightly smaller diameter than said shell and an outer wall which increases in diameter as it extends downstream from a point abutting said cylindrical shell, thus providing an open-ended chamber between said inner cylindrical wall and said outer wall of increasing diameter through which the outer boundary layer of air and water particles can pass, said cylindrical shell being broken away throughout the length of said chamber, said outer wall having at least one arcuate opening therein through which water particles thrown to the outer periphery of said chamber by centrifugal force can pass, and baffle means within said chamber and extending generally radially outwardly from said inner cylindrical wall for directing liquid which is removed gravitationally from said gaseous stream outwardly through said last mentioned at least one arcuate opening.

8. A separating device as in claim 7 in which said baffle means include a plurality of longitudinally spaced annular baffles having arcuate openings throughout at least substantially their entire circumferential length fixed between said outer and inner walls of said chamber, said outer wall having arcuate openings adjacent each of said baffles on the upstream side thereof.

9. A separating device as in claim 7 in which said baffle means includes a spiral member secured between said outer and inner walls of said chamber, said outer wall having a plurality of spiral openings therein adjacent the upstream surfaces of the turns of the spiral.

10. In a device for separating foreign matter from a gaseous medium, an elongated open-ended generally cylindrical outer shell, means for moving a gaseous stream through said shell, means for subjecting said gaseous stream to liquid contact whereby the particles of foreign matter are brought in contact with and commingled with liquid particles, an elongated core having at least a part thereof concentric with and of a smaller diameter than said cylindrical shell and positioned within the latter downstream from said last means, thus providing an annular space between said core and said shell, means adjacent the upstream end of said core for imparting a vortical swirl to said gaseous stream, means for rotating at least a portion of said core in the same general direction as said gaseous flow, and means for removing the liquid particles thrown to the outside of said annular space, said last means including at least one arcuate opening in said outer shell at a point downstream from said swirl imparting means, said means for removing the water particles thrown to the outside of said annular space also including a further means having an inner cylindrical wall of a slightly smaller diameter than said shell and an outer wall which increases in diameter as it extends downstream from a point abutting said cylindrical shell, thus providing an open-ended chamber between said inner cylindrical wall and said outer wall of increasing diameter through which the outer boundary layer of air and water particles can pass, said cylindrical shell being broken away throughout the length of said chamber, said outer wall having at least one arcuate opening therein through which water particles thrown to the outer periphery of said chamber by centrifugal force can pass, and baffle means within said chamber and extending generally radially outwardly from said cylindrical wall for directing liquid which is removed gravitationally from said gaseous stream outwardly through said last mentioned opening.

11. In a device for separating foreign matter from a gaseous medium, an elongated open-ended generally cylindrical outer shell, means for moving a gaseous stream through said shell, means for subjecting said gaseous stream to liquid contact whereby the particles of foreign matter are brought in contact with and commingled with liquid particles, an elongated core having at least a part thereof concentric with and of a smaller diameter than said cylindrical shell and positioned within the latter downstream from said last means, thus providing an annular space between said core and said shell, means adjacent the upstream end of said core for imparting a vortical swirl to said gaseous stream, means for rotating at least a portion of said core in the same general direction as the flow of gases including a plurality of circumferentially spaced vanes fixed to said at least a portion of said core, and means for removing the liquid particles thrown to the outside of said annular space, said last means including at least one arcuate opening in said outer shell at a point downstream from said swirl imparting means, said means for removing the water particles thrown to the outside of said annular space also including a further means having an inner cylindrical wall of a slightly smaller diameter than said shell and an outer wall which increases in diameter as it extends downstream from a point abutting said cylindrical shell, thus providing an open-ended chamber therebetween through which the outer boundary layer of air and water particles can pass, said cylindrical shell being broken away throughout the length of said chamber, said outer wall having at least one arcuate opening therein through which water particles thrown to the outer periphery of said chamber by centrifugal force can pass, and baffle means within said chamber and extending generally radially outwardly from said cylindrical wall for directing liquid which is removed gravitationally from said gaseous stream outwardly through said last mentioned opening.

12. A separating device comprising, a shell defining an elongated path for the flow of a gas therethrough, said gas having foreign particles entrained therein, means for introducing a liquid into said path, a mixing member disposed to extend across said path and spaced from said liquid introducing means for causing an introduced liquid to be mixed with said particles when said gas stream initially flows past said liquid introducing means and then through said mixing member, said mixing member comprising a plurality of elongated members which are laterally spaced from each other so that there is no substantial pressure drop in a gas and liquid stream flowing therethrough, an elongated core concentric with and positioned within said shell downstream from said mixing member to provide an annular passageway for the wetted gaseous stream between said core and said shell through which said wetted gas stream flows at a higher velocity than the velocity of said gas stream upstream thereof, means positioned within said annular passageway for imparting a vortical swirl to said wetted gaseous stream, and means in said shell downstream from said swirl imparting means for collecting the liquid and particles entrained in said wetted gaseous stream, and means for rotatably mounting at least a portion of said core for rotating it in the same general direction as the circumferential flow of gases.

13. A separating device as in claim 12, said last means including a plurality of circumferentially spaced vanes secured to said rotatably mounted portion of said core.

14. A separating device comprising: an elongated hollow member defining a flow path for a first fluid therethrough, such first fluid having foreign particles entrained therein; means located adjacent the upstream end of said hollow member for introducing a second fluid into said flow path; a plurality of laterally spaced elongated members located downstream from said second fluid introducing means and extending across said flow path with adjacent ones of said members defining openings therebetween, said elongated members projecting in overlapping relationship when viewed from a plane normal to said flow path so as to cause impaction on said elongated members of substantially all of such foreign particles in said flow path and intimate commingling of such foreign particles and such second fluid; an elongated core of a smaller cross sectional area than said hollow member which core is concentrically positioned within said hollow member downstream from said elongated members providing an annular passageway for the flow of such a commingled particle entrained fluid between said core and said hollow member through which such commingled particle entrained fluid flows at a higher velocity than the flow of such particle entrained fluid upstream thereof, means positioned within said annular passageway for imparting a vortical swirl to such commingled particle entrained fluid, means in said hollow member downstream from said swirl imparting means for collecting such commingled particles entrained in such first fluid, and means for rotatably mounting at least a portion of said core for rotating it in the same general direction as the circumferential flow of said first fluid.

15. A separating device comprising, an elongated hollow member defining a flow path for a gaseous fluid therethrough, such gaseous fluid having foreign particles entrained therein, an admixing means supported within said hollow member, means for introducing a liquid onto the upstream side of said admixing means, said admixing means having portions spaced in the direction of flow of such gaseous fluid and liquid which portions define openings therebetween, said portions being in overlapping relationship when viewed from a plane normal to such flow path to cause impaction on said portions of substantially all of such foreign particles in such flow path and intimate commingling of such foreign particles with such liquid which commingled particles and liquid subsequently pass through said openings, and said hollow member having means spaced downstream from said admixing means for collecting substantially all of such commingled particles and liquid.

16. A separating device comprising an elongated hollow member defining a flow path for a gaseous fluid therethrough, such gaseous fluid having foreign particles entrained therein, means extending into said hollow member for introducing a liquid into such flow path, an admixing means supported within said hollow member downstream from said liquid introducing means, said admixing means having portions spaced in the direction of flow of such fluid and such liquid which portions define openings therebetween, said portions being in overlapping relationship when viewed from a plane normal to such a flow path to cause impaction on said portions of substantially all of such foreign particles in such flow path and intimate commingling of such foreign particles with such liquid which commingled particles and liquid subsequently pass through said openings, and said hollow member having means spaced downstream from said admixing means for collecting such commingled particles and liquid.

17. A separating device comprising, an elongated hollow member defining a flow path for a gaseous fluid therethrough wherein foreign particles are entrained therein, a series of elongated members extending across said flow path in overlapping relationship, said members being spaced from each other to provide openings therebetween, said openings providing flow paths for the flow of such a gaseous fluid therethrough with no substantial drop in pressure occurring in such a flow, means mounted on the upstream side of said members for introducing a liquid, said overlapping relationship defining intersecting planes whose projection upon a plane normal to the longitudinal axis of said hollow member defines a solid plane which overlapping relationship causes impaction of substantially all of such particles on said elongated members and intimate commingling of such particles with such second fluid, and said hollow member having means spaced downstream from said elongated members for collecting substantially all of such commingled particles and liquid.

18. A separating device comprising an elongated hollow member defining a flow path for a gaseous fluid therethrough, such gaseous fluid having foreign particles entrained therein, means located in said hollow member for introducing a liquid into such flow path, means located in said hollow member for causing said liquid and gaseous fluids to flow therethrough at a velocity of at least 3000 feet per minute, a plurality of laterally spaced elongated members located downstream from said liquid introducing means and extending across such flow path with adjacent ones of said members defining openings therebetween, said elongated members being in overlapping relationship when viewed from a plane normal to such a flow path, said velocity being such as to cause the inertial forces acting upon all particles greater than three microns in size other than the particles of said gaseous fluid to be at least equal to the viscous forces acting on such three micron particles causing all such three micron particles to become disentrained from said gaseous fluid stream and impact upon said elongated members and become commingled, said second mentioned means causing reentrainment of such commingled particles and liquid on the downstream side of said elongated members, and said hollow member having means spaced downstream from said elongated members for collecting substantially all of such commingled particles and liquid.

19. A separating device comprising an elongated hollow member defining a flow path for a gaseous fluid therethrough, such gaseous fluid having foreign particles entrained therein, means located adjacent the upstream end of said hollow member for introducing a liquid into such flow path, a plurality of laterally spaced elongated members of circular cross section and of the same diameter located downstream from said liquid introducing means and extending across such flow path with adjacent ones of said members defining openings therebetween, said elongated members being in overlapping relationship when viewed from a plane normal to such flow path so as to cause impaction on said elongated members of substantially all of such particles in such flow path, said openings defining flow paths for such liquid and gaseous fluid and such impacted foreign particles, and said hollow member having means spaced downstream from said elongated members for collecting substantially all of such liquid and such impacted foreign particles.

20. A separating device comprising an elongated hollow member defining a flow path for the flow of a gaseous fluid therethrough, such gaseous fluid having foreign particles entrained therein, means located adjacent the upstream end of said hollow member for introducing a liquid into said flow paths, a formed screen located downstream from said liquid introducing means, said formed screen having a plurality of contiguous V-shaped portions each side of each V-shaped portion having a plural- of laterally spaced elongated members extending across said flow path with adjacent ones of said members defining openings therebetween, said elongated members being in overlapping relationship when viewed from a plane normal to such flow path so as to cause impaction on said elongated members of substantially all of such foreign particles and intimate commingling of such particles with such liquid which commingled particles subsequently pass through said opening, and said hollow member having means spaced downstream from said formed screen for collecting substantially all of such commingled liquid and foreign particles.

21. A separating device comprising an elongated hollow member defining a flow path for a gaseous fluid therethrough, such gaseous fluid having foreign particles entrained therein, means located adjacent the upstream end of said hollow member for introducing a liquid into said flow path, a screen having a zigzag fold configuration each fold of said screen having a plurality of laterally spaced elongated members of circular cross section and of the same diameter extending across a portion of said flow path with adjacent ones of said members defining openings therebetween, said elongated members being in overlapping relationship when viewed from a plane normal to said flow path so as to cause impaction on said elongated members of substantially all of such foreign particles and intimate commingling of such foreign particles with such liquid which commingled particles subsequently pass through said openings, and said hollow member having means spaced downstream from said screen for collecting substantially all of such commingled liquid and foreign particles.

22. An apparatus for admixing particles entrained in a gaseous fluid stream comprising, a hollow housing defining a flow path for such stream for generally unidirectional flow therethrough, means within said housing for causing such stream and entrained particles to flow therethrough at a velocity of at least 3000 feet per minute, a plurality of laterally spaced elongated members extending across a portion of such flow path and defining a plane at an angle to a plane normal to the direction of flow of such stream, means for introducing a liquid onto the upstream side of said members, adjacent ones of said laterally spaced members defining openings therebetween, said elongated members being located in overlapping relationship when viewed from a plane normal to the direction of flow of such stream so as to cause impaction on said elongated member and the commingling of substantially all of such liquid and such particles entrained in such stream, and said openings providing flow paths for such commingled particles and liquid and such gaseous fluid to flow downstream therethrough with no substantial drop in pressure occurring.

23. An apparatus for admixing particles entrained in a gaseous fluid stream comprising, a hollow housing defining a flow path for such stream for generally unidirectional flow therethrough, means within said housing for causing such stream and entrained particles to flow therethrough at a velocity of at least 3000 feet per minute, a plurality of laterally spaced elongated members of circular cross section and of the same diameter extending across a portion of such flow path and defining plane at an angle to a plane normal to the direction of flow of such a fluid stream, means for introducing a liquid onto the upstream side of said members, adjacent ones of said laterally spaced members defining openings therebetween and said elongated members being located in overlapping relationship when viewed from a plane normal to the direction of such stream so as to cause impaction on said members and commingling of substantially all of such liquid and such particles entrained in such stream, and said openings providing flow paths for such commingled particles and liquid and such gaseous fluid to flow downstream therethrough with no substantial drop in pressure occurring.

24. An apparatus for admixing particles entrained in a gaseous fluid stream comprising, a hollow housing defining a flow path for such stream for generally unidirectional flow therethrough, means located in said housing for causing such stream and entrained particles to flow therethrough at a velocity of at least 3000 feet per minute, a formed screen having a plurality of contiguous V-shaped portions, each side of each V-shaped portion having a plurality of laterally spaced elongated members extending across said portion of said stream and defining a plane at an angle to a plane normal to the direction of flow of such stream, means for introducing a liquid onto the upstream side of said members, adjacent ones of said laterally spaced members defining openings therebetween, said elongated members being located in overlapping relationship when viewed from a plane normal to the direction of flow of such stream so as to cause impaction on said elongated members and the commingling of substantially all of such particles entrained in such liquid and such stream, and said openings providing flow paths for such commingled particles and liquid and such gaseous fluid to flow downstream therethrough with no substantial drop in pressure occurring.

25. An apparatus for admixing particles entrained in a gaseous fluid stream comprising, a hollow housing defining a flow path for such stream for generally unidirectional flow therethrough, means located in said housing for causing such stream and entrained particles to flow therethrough at a velocity of at least 3000 feet per minute, a screen having a zigzag fold configuration, each fold of said screen having a plurality of laterally spaced elongated members extending across a portion of such stream and defining a plane at an angle to a plane normal to the direction of flow of such a stream, means for introducing a liquid onto the upstream side of said members, adjacent ones of said laterally spaced members defining openings therebetween, said elongated members being located in overlapping relationship when viewed from a plane normal to the direction of flow of such stream so as to cause impaction on said elongated members such particles entrained and intimate commingling of substantially all of such liquid and such particles entrained in such stream, and said openings providing flow paths for such commingled particles and liquid and such gaseous fluid to flow downstream therethrough with no substantial drop in pressure occurring.

26. A method of admixing particles entrained in a unidirectional flowing gaseous fluid stream comprising the steps of, causing such a stream to flow at a velocity of at least 3000 feet per minute in a given path, introducing a liquid spray into such stream, intercepting the rectilinear flow of such a fluid stream at portions spaced longitudinally and laterally of an intermediate longitudinal portion of such path so as to cause impaction and commingling of substantially all such entrained particles and a slight temporary deviation thereof from such unidirectional flow along such intermediate longitudinal portion of such path.

27. A method of admixing foreign particles and liquid comprising the steps of: introducing a liquid into a flowing gaseous stream having foreign particles entrained therein so that said liquid is also entrained in said stream causing such stream with the liquid and foreign particles entrained therein to flow at a velocity of at least 3000 feet per minute in a given rectilinear path; intercepting such rectilinear flowing stream along an intermediate longitudinal portion of such parth at portions spaced longitudinally and laterally thereacross so as to cause impaction and commingling of substantially all of such foreign particles and liquid and to cause such a stream and such commingled foreign particles and liquid to temporarily deviate slightly laterally from such unidirectional flow along such intermediate longitudinal portion of such path.

References Cited in the file of this patent
UNITED STATES PATENTS

| | | |
|---|---|---|
| 833,686 | Hart | Oct. 16, 1906 |
| 1,226,753 | Critchlow | May 22, 1917 |
| 1,516,187 | Hanson | Nov. 18, 1924 |
| 1,815,306 | Lawrence | July 21, 1931 |
| 2,008,800 | Somers | July 23, 1935 |
| 2,199,632 | Keyes | May 7, 1940 |
| 2,226,127 | Harmon | Dec. 24, 1940 |
| 2,258,901 | Lykken | Oct. 14, 1941 |
| 2,265,091 | Van Tongeren | Dec. 2, 1941 |
| 2,310,411 | Fisher | Feb. 9, 1943 |
| 2,661,076 | Walker | Dec. 1, 1953 |
| 2,667,942 | Wintermute | Feb. 2, 1954 |

FOREIGN PATENTS

| | | |
|---|---|---|
| 121,554 | Sweden | Apr. 27, 1948 |
| 380,099 | Great Britain | Aug. 29, 1932 |
| 391,719 | France | Sept. 4, 1908 |
| 498,585 | Italy | Sept. 30, 1954 |
| 628,212 | Great Britain | Aug. 24, 1949 |
| 869,334 | Germany | Mar. 2, 1953 |
| 911,013 | Germany | May 10, 1954 |